April 28, 1970  C. L. SMALL  3,508,784
VEHICLE CAB MOUNTING
Filed May 28, 1968  2 Sheets-Sheet 1
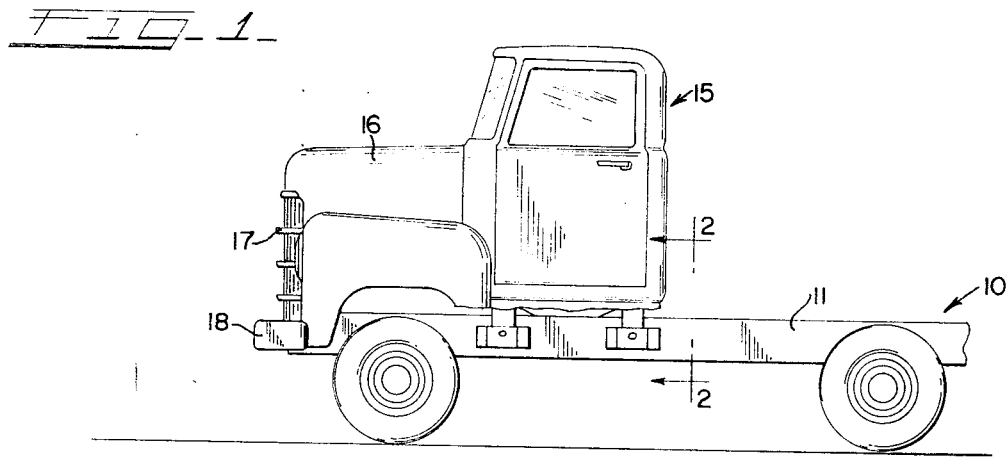
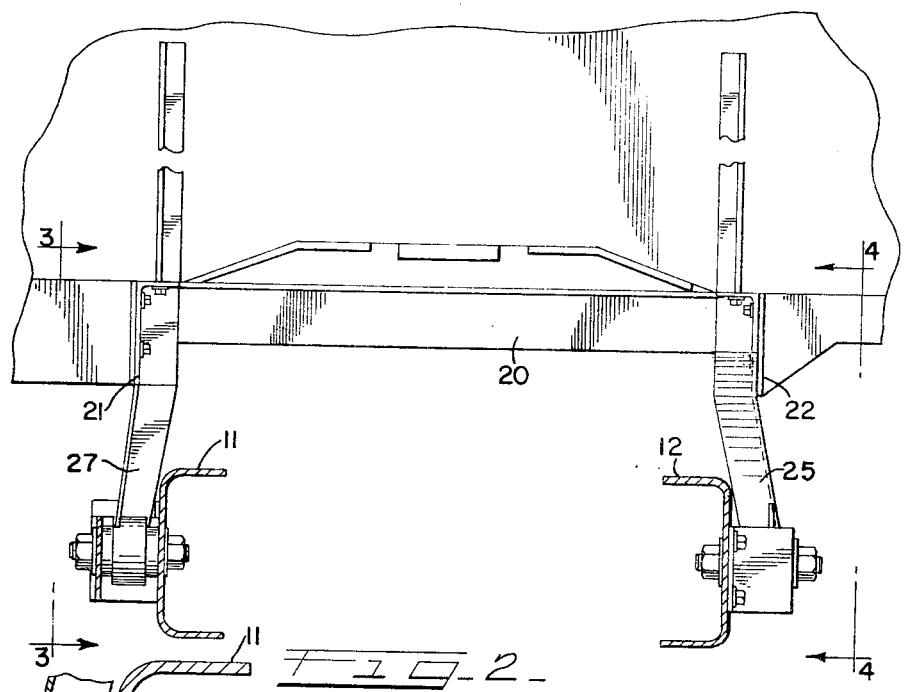
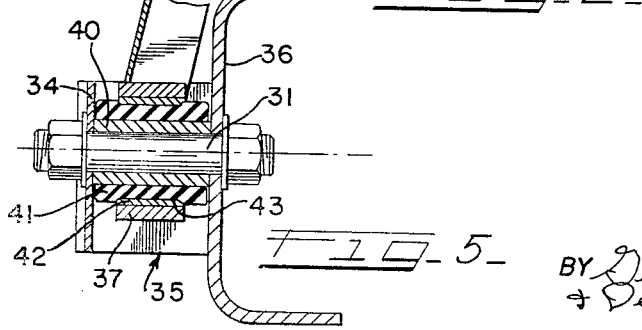
INVENTOR
CHARLES L. SMALL
BY
ATT'YS.

April 28, 1970     C. L. SMALL     3,508,784
VEHICLE CAB MOUNTING
Filed May 28, 1968     2 Sheets-Sheet 2
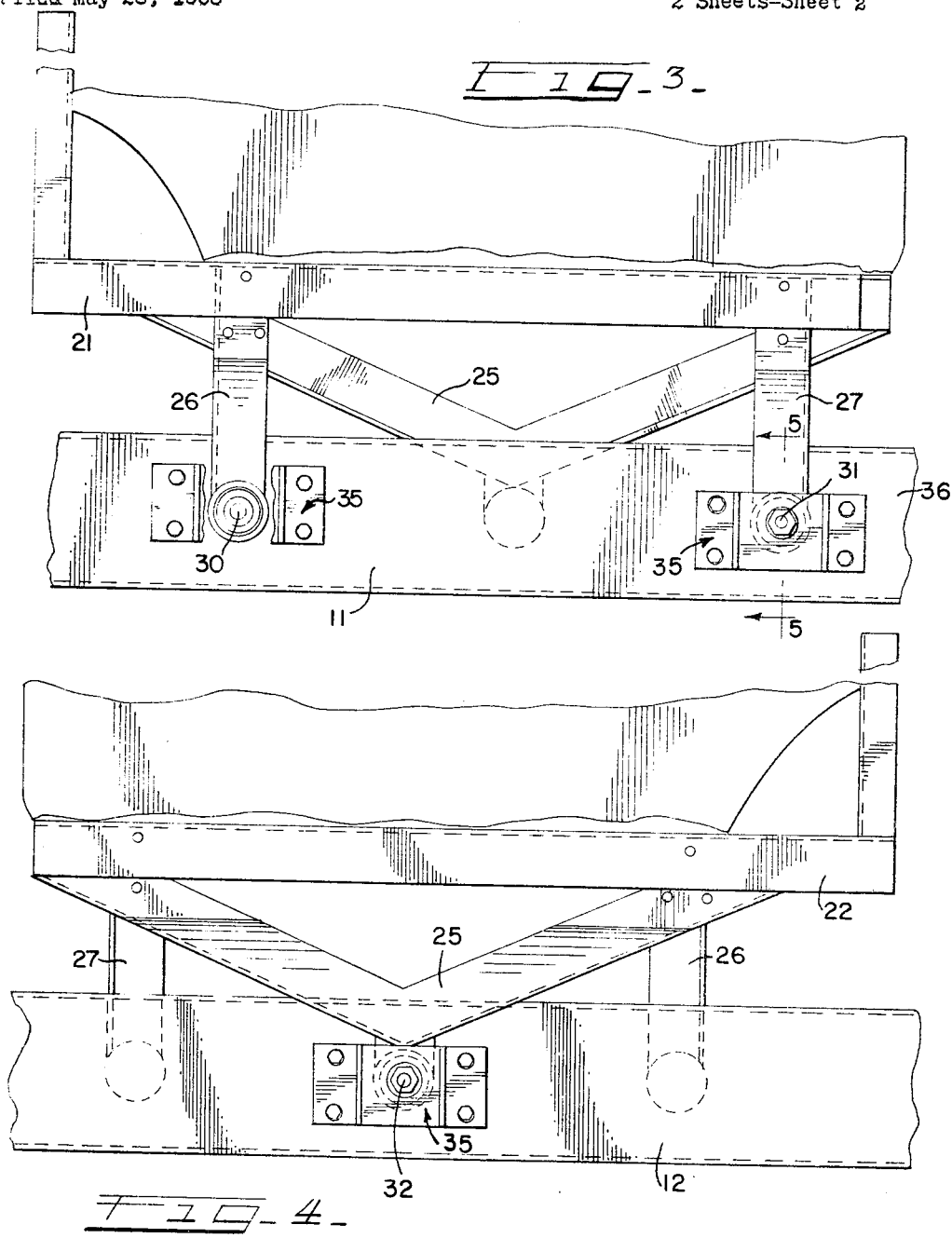
INVENTOR
CHARLES L. SMALL
BY Reid, Lockwood, Greenawalt
    + Dewey
    ATT'YS.

United States Patent Office 3,508,784
Patented Apr. 28, 1970

3,508,784
VEHICLE CAB MOUNTING
Charles L. Small, Chicago, Ill., assignor to Hendrickson Mfg. Co., Lyons, Ill., a corporation of Illinois
Filed May 28, 1968, Ser. No. 732,783
Int. Cl. B62d 39/00
U.S. Cl. 296—35                                 7 Claims

ABSTRACT OF THE DISCLOSURE

A cab mounting for a heavy duty motor vehicle wherein the cab frame is supported on the side rail members of the vehicle frame by resilient connections at three points arranged in triangular formation and disposed in a horizontal plane extending through the longitudinal center line of the frame side rail members with two of the connecting points spaced along the one side rail member and the other connecting point on the opposite side rail member.

---

This invention relates to body mounting means for automotive vehicles and is more particularly concerned with new and improved mounting connections for supporting a truck cab and any associated elements, such as the hood, fenders and radiator which may be connected thereto, on the chassis frame.

In the design of trucks or other vehicles for carrying heavy loads over uneven terrain or irregular road surfaces, it is necessary to take into account the severe torsional stresses and forces which are imposed on the chassis frame due to vertical movement of the ground engaging wheels which may be elevated to different levels with resultant transmission of severe torsional stresses and forces to the frame members. Chassis frames are generally designed and constructed in such a way that they are relatively flexible and thereby capable of relieving the torsional forces imposed on them by distortion of the frame side members. It has been found in practice that securing the vehicle cab or operator's compartment and components such as the hood, fenders and radiator grille, which may be attached to the cab frame, directly to the chassis frame in such a manner that there is very little relative movement between the chassis frame and the body structure results in direct transmission of distorting forces with damaging results to the cab structure. Various efforts have been made to connect the cab structure to the chassis frame in a non-rigid manner as to reduce the twisting and bending of the same when the chassis frame is subjected to torsional stress. However, some of the proposed arrangements have been found impractical because of interference with other equipment located at this point on the vehicle while other arrangements have not proven satisfactory because they fail to accomplish the desired result or they have been too complicated and too costly from a production standpoint. It is, therefore, the primary object of the present invention to provide a novel means for supporting a vehicle cab structure on a flexible chassis frame so that there is a minimum transmission of forces, shocks and vibrations to the cab structure while the latter is movable as a unit with respect to the chassis frame.

A more specific object of the invention is to provide a mounting for a vehicle cab structure in which the cab frame is connected to the chassis frame at three points arranged in a triangle with two of the connecting points at one side of the vehicle and the third connecting point at the other side of the vehicle.

Another object of the invention is to provide a vehicle cab mounting wherein the cab frame is connected to the vehicle chassis at two longitudinally spaced points on one side of the vehicle and at one point on the other side of the vehicle with the connecting points being in a transverse plane extending through the center line of the side frame members.

These and other objects and advantages of the invention will be apparent from a consideration of the cab mounting structure which is shown by way of illustration in the accompanying drawings wherein:

FIGURE 1 is a side elevation of a vehicle with portions broken away which incorporates a cab structure mounted on the vehicle chassis in accordance with the principles of the invention;

FIGURE 2 is a partial cross section taken on the line 2—2 of FIGURE 1, to an enlarged scale;

FIGURE 3 is an elevational view taken on the line 3—3 of FIGURE 2, to a still larger scale;

FIGURE 4 is an elevational view taken on the line 4—4 of FIGURE 2, to a larger scale; and FIGURE 5 is a fragmentary cross section taken on the line 5—5 of FIGURE 3, to a larger scale.

Referring to the drawings, there is shown a motor truck chassis frame 10 which includes a pair of laterally spaced, longitudinally extending, side frame or sill members 11 and 12 having conventional channel-shaped form. The side frame members 11 and 12 are interconnected by cross frame members of a suitable character (not shown) such as provided in conventional motor truck chassis frame constructions.

The vehicle body, as shown in FIGURE 1, includes an operator's compartment or cab 15, a hood 16, radiator grille 17 and fender structures 18. The cab 15 may have the hood 16, grille 17 and fenders 18 attached to a cab frame structure 20 (FIGURE 2) or these members may be attached directly to the chassis frame 10, with clearance for relative movement between the same and the cab, or with flexible connections between same and the cab frame, so that the latter may have relatively independent movement with respect to the chassis frame 10. The cab frame structure 20 as shown in FIGURES 2 to 4, includes a bottom support frame with side rails 21 and 22 which may be angle bars or the like and cross rails of the same type, indicated at 23. At one side of the cab frame 20 an inverted V-shaped frame member 25 depends from the bottom side rail 21 for connection with the chassis side frame rail 11. At the other side of the cab frame there are two depending brackets 26 and 27 which are spaced longitudinally of the side frame member 22 for connection with the vehicle chassis side frame rail 12. The brackets 25, 26 and 27 are connected to the chassis side frame members 11, 12 at three points. The three connections between the depending brackets 25, 26 and 27 and the side frame members 11 and 12 of the vehicle chassis are of identical construction and only one thereof will be described. The three connections are centered on pins 30, 31 and 32 which have their axes substantially in a plane which extends through the longitudinal center lines of the chassis side frame members 11 and 12.

Referring to FIGURE 5, the pin 31 extends outwardly or laterally on the longitudinal center line of the chassis side frame member 11 with its outer end supported in the outer wall 34 of a U-shaped bracket 35 which has end flanges on its legs bolted or otherwise secured to the outer face of the vertically disposed web portion 36 of the side frame member 11. The bracket 27 which depends from the cab support frame 20 has a bearing portion 37 on its bottom end through which the pin 31 extends, with an interposed cushion forming assembly which includes a bearing sleeve 40 on the pin 31, a cushion sleeve of rubber or similar material 41, and a bearing sleeve 42 which forms a liner for the bearing member 37 and which is set in a shallow circumferential groove 43 in the cushion member 41 so as to prevent sliding movement on the member 41. The three connections normally hold the cab support frame 20 in fixed relation on the chassis frame while permitting a limited amount of movement at each connecting point. The location of the connecting pins 30, 31 and 32 along the longitudinal center line of the chassis frame members 11 and 12 is found to transmit minimum stress from the chassis frame to the cab support frame.

The operation of the structure described herewith provides a more satisfactory mounting for the cab than heretofore provided. The three point connection arrangement with the one connecting point on the one side of the frame and the two spaced connecting points on the other side provide stability and hold the cab in a horizontal plane with minimum effect on the cab support frame when stresses are set up in the side frame members 11 and 12 due to twisting or turning of the latter resulting from passage over uneven surfaces, starting and stopping, braking and other movements of the vehicle.

In the form of the invention illustrated, resilient-type connections are employed at the three points where the cab structure is attached to the vehicle side frame members. This type connection is preferred to help reduce some of the high frequency road vibrations. However, a regular ball joint connection which will allow movement can be used and will eliminate transfer of twisting force to the cab structure which may otherwise occur when a rigid connection is employed.

While specific materials and particular details of construction have been referred to in describing the cab mounting which is illustrated, it will be understood that other suitable materials and equivalent structural details may be resorted to within the spirit of the invention.

I claim:

1. In a motor vehicle having a chassis frame with longitudinal side frame members, a mounting for an operator's cab structure which has a bottom support frame, bracket members depending from opposite sides of said cab support frame, means forming a resilient connection between a bracket member at one side of said cab support frame and a side frame member at a corresponding side of said chassis frame, and means forming resilient connections between a pair of longitudinally spaced bracket members at the other side of said cab support frame and longitudinally spaced points on the side frame member at a corresponding side of said chassis frame whereby said cab support frame is connected to said chassis frame at three points which are in triangle arrangement with a side of the triangle extending along one side of the chassis frame.

2. In a motor vehicle as set forth in claim 1 and said resilient connections each comprising a connecting pin extending laterally of a chassis side frame member, a bracket depending from said cab support frame and a resilient bushing interposed between said connecting pin and said bracket.

3. In a motor vehicle as set forth in claim 1 and said resilient connections being in a common transverse plane which extends through the longitudinal center lines of the chassis side frame members at the point of connection therewith.

4. In a motor vehicle as set forth in claim 1, and said resilient connections each comprising a bracket depending from said cab support frame and having a bearing forming sleeve, a connecting pin extending laterally of a chassis side frame member and through said bearing forming sleeve, said connecting pin being in a common transverse plane with the longitudinal center line of said side frame member, a bearing bracket supporting the free end of said connecting pin, and a resilient bushing interposed between said bearing forming sleeve and said connecting pin.

5. In a heavy duty motor vehicle having a chassis frame with laterally spaced, longitudinally extending side frame members, a mounting for an operator's cab structure which includes a bottom support frame, an inverted V-shaped bracket depending from a longitudinal side of said cab support frame, a pair of spaced bracket members depending from the opposite side of said cab support frame, support pins extending laterally of the chassis side frame members, a resilient connection between the apex of said V-shaped bracket and a support pin at one side of said chassis side frame, and a resilient connection between each of said pair of spaced bracket members at the other side of said cab frame and a support pin extending from the side frame member at the corresponding side of said chassis frame, whereby said cab support frame is resiliently connected to said chassis frame at three points which are in a triangle arrangement with one side of the triangle extending along the center line of the one chassis side frame member.

6. In a motor vehicle having a chassis frame with laterally spaced longitudinal side frame members, a mounting for an opearator's cab structure which has a bottom support frame with depending bracket forming portions, means forming a connection between a bracket forming portion at one side of said cab support frame and a point on a side frame member at a corresponding side of said chassis frame, and means forming a pair of spaced connections between bracket forming portions at the other side of said cab support frame and longitudinal spaced points on the side frame member at the other side of said chassis frame, said connections between said cab support frame and said chassis frame being in triangle arrangement with a side of the triangle extending along one longitudinal side of the chassis frame and said connections being yielding so as to permit limited movement between said cab frame and said chassis frame and thereby to eliminate transfer of twisting movement.

7. In a motor vehicle as set forth in claim 6 and said connecting points being in a common transverse plane which extends through the longitudinal center lines of the chassis longitudinal side frame members.

References Cited

UNITED STATES PATENTS

| 1,547,516 | 7/1968 | Neff. |
| 3,088,537 | 5/1963 | Le Tourneau. |

LEO FRIAGLIA, Primary Examiner

J. A. PEKAR, Assistant Examiner